United States Patent [19]

Alvarez, II et al.

[11] Patent Number: 4,953,077
[45] Date of Patent: Aug. 28, 1990

[54] ACCELERATED DATA TRANSFER MECHANISM USING MODIFIED CLOCK CYCLE

[75] Inventors: Manuel J. Alvarez, II, Binghamton; Earl W. Jackson, Jr., Apalachin, both of N.Y.

[73] Assignee: International Business Machines Corporation, Armonk, N.Y.

[21] Appl. No.: 49,908

[22] Filed: May 15, 1987

[51] Int. Cl.$^5$ .......................... G06F 1/04; G06F 13/00
[52] U.S. Cl. .................................. 364/200; 364/270.2; 364/270.3; 364/270.9; 364/243.41
[58] Field of Search ................... 364/200 MS, 900 MS

[56] References Cited

U.S. PATENT DOCUMENTS

| | | | |
|---|---|---|---|
| 4,084,234 | 4/1978 | Calle et al. | 364/200 |
| 4,169,284 | 9/1979 | Hogan | 364/200 |
| 4,191,998 | 3/1980 | Carmody | 364/200 |
| 4,437,155 | 3/1984 | Sawyer et al. | 364/200 |
| 4,439,829 | 3/1984 | Tsiang | 364/200 |
| 4,463,424 | 7/1984 | Mattson et al. | 364/200 |
| 4,713,751 | 12/1987 | Datton et al. | 364/200 |

OTHER PUBLICATIONS

Pitkowsky et al. "Data Processing System Clock Control" IBM Tech. Discl. Bull., vol. 7, No. 9, Feb. 1965, pp. 754–755.

Maholick, A. "Ternary Logic Memory Elements" IBM Tech. Disc. Bull., vol. 26, no. 3A, Aug. 1983, pp. 1196–1197.

Primary Examiner—Raulfe B. Zache
Assistant Examiner—Ayni Mohamed
Attorney, Agent, or Firm—David S. Romney; Mark Levy

[57] ABSTRACT

A data processing system having a first logical device capable of sending and receiving clocked electronic data and a second logical device connected to the first logical device, the second logical device also being capable of sending and receiving clocked electronic data. A controller is connected to the first and second logical devices for controlling data transfer therebetween. The controller includes a clock edge generator and gating logic connected thereto for allowing the first logical device to accept data and the second logical device to send data during a time interval of an odd number of clock edges.

19 Claims, 5 Drawing Sheets

ACCELERATED DATA TRANSFER MECHANISM USING MODIFIED CLOCK CYCLE

BACKGROUND OF THE INVENTION

The present invention relates to a data processing system having at least two logical devices and, more particularly, to an improved memory access management mechanism for controlling data transfer between logical devices in a data processing system.

In the field of data processing, sophisticated high speed computers often incorporate large memories or data storage devices. While the speed of the engines or processors within such computer systems has consistently increased over the years, so too have computer applications continued to demand ever greater speeds.

Among the many variables to be considered in an attempt to increase the performance of data processing systems, two considerations are the speed of the system processor and the speed with which data can be transferred between the main storage and the processor. In general, when two or more logic devices are incorporated in a computer system, one of the devices operates at a slower rate of speed than do the remaining devices. Overall system performance is of course dependent upon the slowest logical device.

As sophisticated computer systems develop, memory storage capacity often increases. Although the operating speed of the smallest components may increase, overall system performance may, in fact, degenerate when memory capacity is extremely large. The speed of a memory device is inversely proportional to the time required to access data stored therein.

Historically, it was common for a processor to communicate with main storage by means of individual connections thereto. The great increase in processing power provided by modern processors, however, resulted in a prodigious amount of data constantly being requested by the processor, exceeding the capacity of the main storage to transfer data to the processor at optimal rates. The size of the memory required for use also increased at a faster rate than that of processor improvement. It would have been uneconomical to continue building non-volatile memories of ever increasing size and speed.

An approach to maximizing performance of a computer system was to develop a temporary memory storage mechanism called a cache. The cache is a relatively high speed memory that tends to be more expensive than conventional data storage devices.

The cache is a limited storage capacity memory that is usually local to the processor and that contains a time-varying subset of the contents of main storage. This subset of data stored in the cache is that data that was recently used by the processor.

The purpose of a cache memory is to reduce cost of a system while minimally affecting the average effective access time for a memory reference. A very high proportion of memory reads can be satisfied out of the high speed cache.

The cache contains a relatively small high speed buffer and control logic situated between two logical devices, such as a processor and main storage. The cache matches the high speed of one of the devices (the processor) to the relatively low speed of the other device (the main storage).

The data most often used is temporarily stored in the high speed buffer. The most recent information requested by one logical device from another logical device is stored in the cache memory simultaneously with its transfer to the first device. Subsequent requests for such information result in the transfer of data directly from the cache to the first device without need for accessing the second device.

When a processor, for example, requests data, a cache first searches its buffer. If the data is stored in the cache, a so-called hit occurs. The data is returned in one cycle. Often, of course, the data sought is not stored in the cache. Consequently, a so-called miss occurs and the cache must retrieve the data from main storage.

A main storage line fetch occurs when the cache accesses data from main storage. A line castout occurs when a line of modified data is returned to main storage from the cache to make room for a new line of data.

As the cache retrieves data from main storage, it often retrieves several more words of data in anticipation that they will soon be requested by the processor. Cache designs include decisions on how much data to fetch for each cache miss and how to decide which data to replace on a miss.

Conventionally, servicing a miss requires many machine cycles. A key factor affecting overall system performance is the amount of time required to service a cache miss (i.e., the amount of time required to move data from main storage to the cache upon issuance of a storage access request). While the amount of time required to perform such a memory access operation is only on the order of milliseconds or even fractions of a millisecond in large computer systems, over a significant period of time these data access operations accumulate and can degrade system performance.

Caches derive their performance from the principle of locality. According to this principle, over short periods of time processor memory references tend to be clustered in both time and space. Data that will be in use in the near future is likely to be currently in use. Similarly, data that will be in use in the near future is located near data currently in use. The degree to which systems exhibit locality determines the benefits of the cache. A cache can contain a small fraction of the data stored in main storage, yet still have hit rates that are extremely high under normal system loads.

A cache generally has an operating cycle of the same length as the processor memory operation microinstruction cycle. For large systems, access time to main storage occurs on the order of 80–120 nanoseconds, whereas access time to cache generally is on the order of 10–20 nanoseconds.

Certain prior art devices divide the cache operating cycle into two or more subcycles dedicated to mutually exclusive operations. U.S. Pat. No. 4,169,284 issued to Hogan, et al., for example, discloses a mechanism by which access to a cache by main storage and by a processor can occur concurrently by means of a cache control which provides two cache access timing cycles during each processor storage request cycle. The cache is accessible to the processor during one of the cache timing cycles and is accessible to main storage during the other cache timing cycle. Thus, each of the machine cycles is divided by two to allow the processor and the main storage to access the cache memory alternately, in equal machine cycle portions.

U.S. Pat. No. 4,439,829 issued to Tsiang discloses a data processing machine in which the cache operating cycle is divided into two subcycles dedicated to mutually exclusive operations. The first subcycle is dedicated to receiving a central processor memory read request with its address and the second subcycle is dedicated to every other kind of cache operation. Such other operations include receiving an address from a peripheral processor after a write to main memory or writing data to the cache after a cache check match condition. After a cache miss, the central processor is stopped to permit updating.

In the general field of logical devices operating at different speeds, "Data Processing System Clock Control" by S. Pitkowsky, et al., IBM Technical Disclosure Bulletin, Vol. 7, No. 9, February 1965, pp. 754–755, discloses a system by which a slower device and a faster device can be made compatible merely by suspending clock operation of the faster device.

In "Ternary Logic Memory Elements" by A. W. Maholick, IBM Technical Disclosure Bulletin, Vol. 26, No. 3A, August 1983, pp. 1196–1197, the ternary equivalence of commonly used memory elements are described. A master-slave flip-flop is set and reset at inverted clock time delayed pulses. The clock pulse is divided into two parts and both clock edges are used.

It would be advantageous to provide a system by which two or more logical devices in a data processing system, all operating at different rates, could be made to transfer data optimally.

It would further be advantageous to shorten data transfer time by reducing the number of machine cycles required to transfer such data.

It would also be advantageous to provide a system for increasing data access performance between two logical devices in a data processing system without increasing the clock system oscillator rate or tranferring data on a half cycle basis.

It would further be advantageous to transfer, during the time interval of a given number of machine cycles, the same amount of data previously transferred during a greater number of such machine cycles.

It would also be advantageous to shorten the time required to transfer data from main storage to high speed buffer or cache.

SUMMARY OF THE INVENTION

In accordance with the present invention, there is provided a data processing system having a first logical device capable of sending and receiving clocked electronic data and a second logical device connected to the first logical device, the second logical device also being capable of sending and receiving clocked electronic data. A controller is connected to the first and second logical devices for controlling data transfer therebetween. The controller includes a clock edge generator and gating logic connected thereto for allowing the first logical device to accept data and the second logical device to send data during a time interval of an odd number of clock edges.

BRIEF DESCRIPTION OF THE DRAWINGS

A complete understanding of the present invention may be obtained by reference to the accompanying drawings, when taken in conjunction with the detailed description thereof and in which.

DETAILED DESCRIPTION OF THE PREFERRED EMBODIMENT

Figure 1:
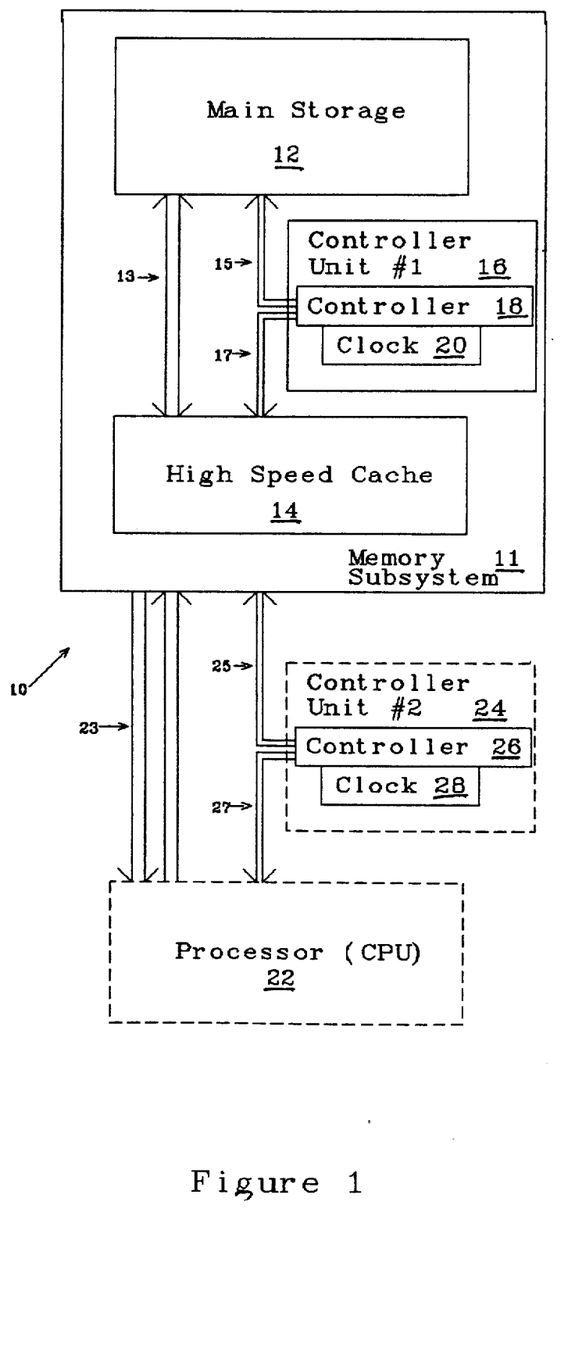
FIG. 1 is a block diagram of a data processing system environment in accordance with the present invention.

Referring now to FIG. 1, there is shown a block diagram of the data processing system of the present invention. Memory and processor subsystems in a digital computer are shown generally at reference numeral 10. The main storage 12 has capacity for storing a plurality of data bits and words. In the capacity on the order of 64M bytes of data and can be accessed randomly. It should be understood, however, that any reasonable capacity of memory can be used within the scope of the present invention.

A portion of the memory and processor subsystem 10, called the memory subsystem 11, consists of a high speed buffer or cache 14 which can store on the order of 64K bytes of data. The cache 14 is connected to the main storage 12 by means of a bi-directional data bus 13. The data temporarily stored in cache 14 can also be accessed randomly and can be updated in 128-byte lines by data transfer from the main storage 12.

Connected intermediate the main storage 12 and the cache 14 by means of signal lines 15 and 17 is a controller unit #1, shown at reference numeral 16. The controller unit 16 has controller logic 18 to which is attached a clock 20. The clock 20 has timing circuitry, as hereinbelow described in further detail, for driving the controller logic 18 and for controlling overall operation of the memory and processor subsystem 10.

A central processing unit (CPU) or processor 22, shown in phantom, can also be incorporated in the computer system environment, if desired, although its inclusion is not required to practice the invention. The processor 22 in the preferred embodiment is a high speed digital computer processor, such as is used in Model No. 4381 available from IBM Corporation. The processor 22 is connected to the memory subsystem 11 by means of a pair of data buses 23.

Controller unit #2, shown in phantom at reference numeral 24, can be connected by means of signal lines 25 and 27 intermediate the cache 14 and the processor 22. When less than four double words of data (i.e., 64 bytes) are to be transferred between the cache 14 and the processor 22, the second controller unit 24 need not be used. In such a case, the processor 22 can be connected to the cache 14 directly. The second controller unit 24 has circuitry for generating clock signals, hereinafter described, which is identical to the clock signal generator circuitry of the first controller unit 16. The second controller unit 24 also includes controller logic 26 and a clock 28. The clock 28 comprises timing circuitry for controlling the controller 26 and data transferred between the cache 14 and the processor 22.

Figure 2A:
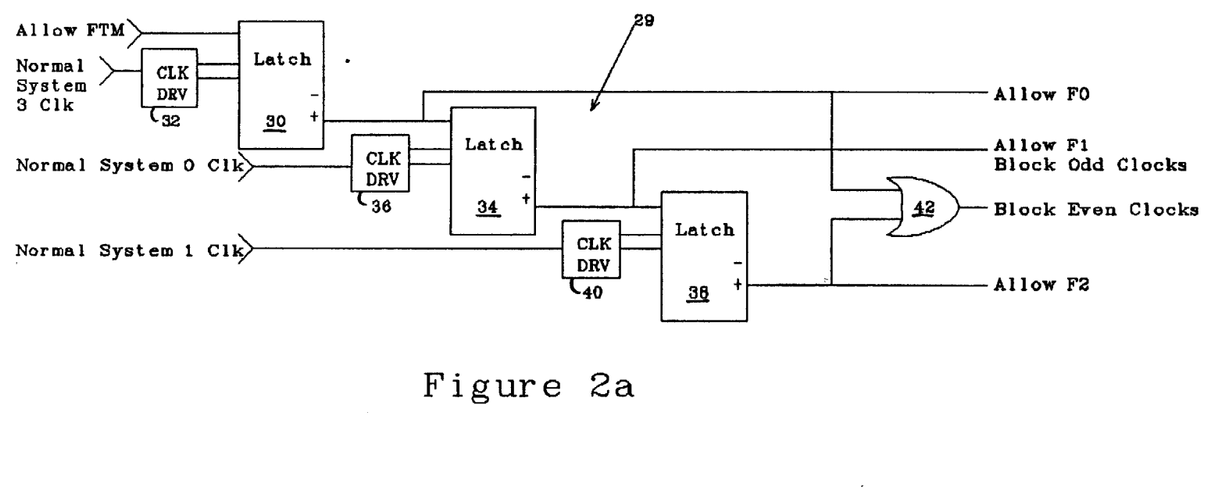
FIGS. 2a and 2b taken together show a logic diagram of the controller for generating clock signals in accordance with the present invention.
Figure 2B:
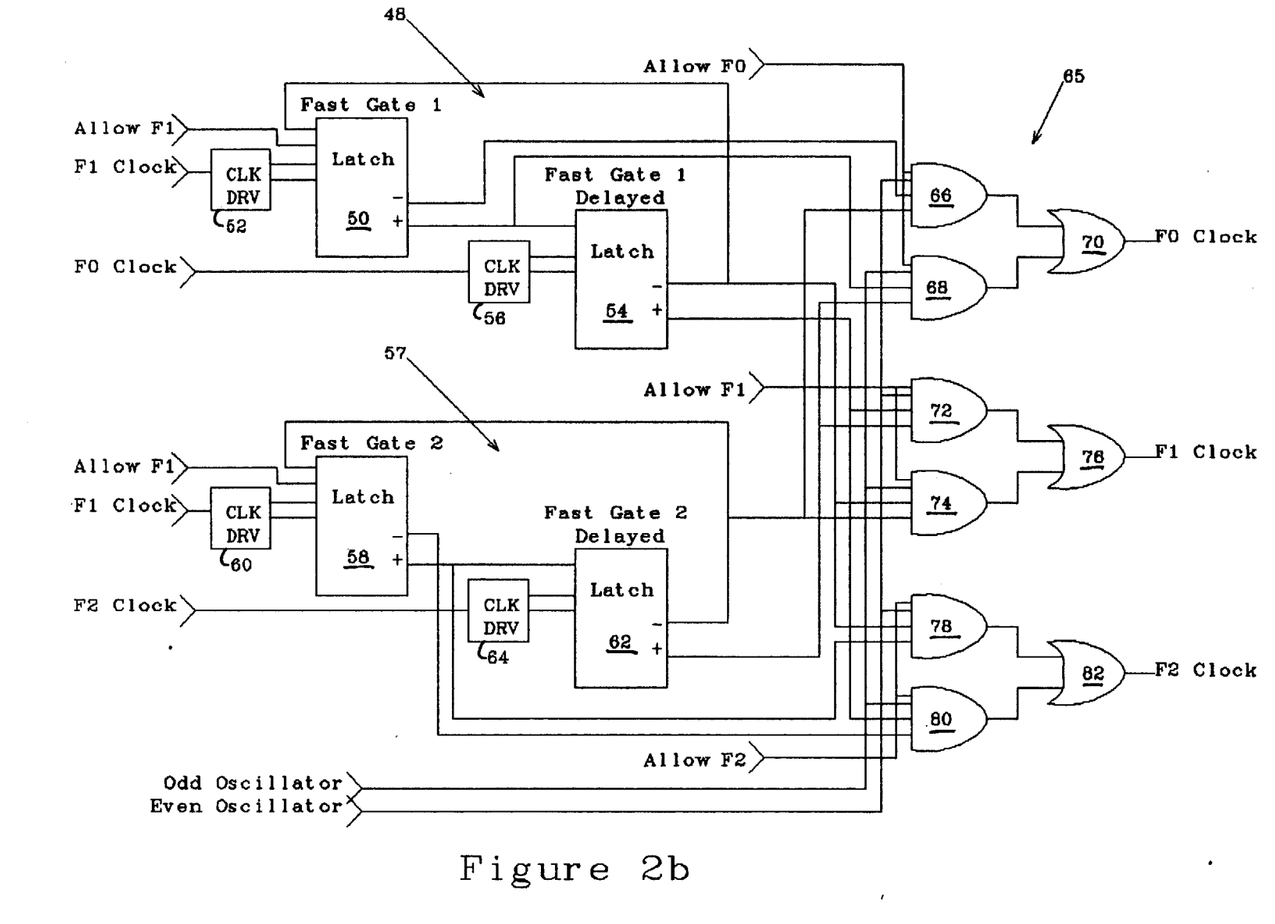

Referring now also to FIGS. 2a and 2b, there is shown a logic diagram of the controller units #1 and #2, reference numerals 16 and 24 (FIG. 1) respectively, for generating clock signals from the clocks 20 and 28 to the controllers 18 and 26 respectively. Specifically, timing logic circuitry shown generally at reference numeral 29 (FIG. 2a) generates signals that are processed further by the logic shown in FIG. 2b, as hereinafter described.

The timing logic 29 consists of a single-input latch or flip-flop 30 driven by a clock driver 32 which, in turn, is derived from the NORMAL CLOCK 3 signal of the computer system, not shown. A signal called ALLOW FTM (fast transfer mechanism) is applied to the latch 30 to turn it on, resulting in an ALLOW F0 signal which is applied to a second single-input latch 34, driven by an associated clock driver 36. A NORMAL CLOCK 0 signal of the system is input to this clock driver 36. The latch 34 generates an ALLOW F1 signal which functions also as a blocking signal for odd clocks. The ALLOW F1 signal is applied to a third single-input latch 38, driven by an associated clock driver 40 to which is input a NORMAL CLOCK 1 signal of the system. The latch 38 generates an ALLOW F2 signal.

The ALLOW F0 and ALLOW F2 signals are applied to an OR gate 42, which generates a blocking signal when either signal input thereto is active. The OR gate 42 blocking signal is used to block even clocks, as hereinafter further described.

FIG. 2b shows logic circuitry for generating fast transfer mechanism (FTM) clock pulses as a result of processing the ALLOW F (ALLOW F0, ALLOW F1 and ALLOW F2) signals generated by timing logic 29. These FTM clock pulses are generated by two pairs of latches, the members of each pair being time delayed with respect to one another in the preferred embodiment, and decode circuitry described in greater detail hereinbelow.

In the Fast Gate 1 portion of the controller logic 48, a two-input polarity hold fast gate latch 50 is driven by a clock driver 52. Connected to latch 50 is another two-input polarity hold latch 54 and its associated clock driver 56. The latches 50 and 54 operate in a master-slave delayed relationship whereby when the first latch 50 is turned on, the second latch 54 is also turned on a short time later. Conversely, when latch 50 is turned off, latch 54 is also turned off.

The Fast Gate 2 portion of the controller logic 57 comprises a two-input polarity hold latch 58 with its associated clock driver 60 connected to another two-input polarity hold latch 62 and its respective clock driver 64. The latches 58 and 62 of the Fast Gate 2 portion of the controller logic 57 also operate in a master-slave delayed relationship in the same manner as do latches 50 and 54 in the Fast Gate 1 circuitry 48.

An ALLOW F1 signal is applied to latch 50 to turn it on. Similarly, the same ALLOW F1 signal is applied to latch 58. The two inputs to latch 50, the ALLOW F1 signal and $\overline{\text{FAST GATE 1}}$ signal, are ANDed together. Similarly, for latch 58 the two inputs, ALLOW F1 and $\overline{\text{FAST GATE 2}}$ are ANDed together.

Circuitry shown generally at reference numeral 65 is decode circuitry. Four-input AND gates 66, 68, 72, 74, 78 and 80 each receive an ALLOW F0, ALLOW F1 or ALLOW F2 signal, and an EVEN OSCILLATOR or ODD OSCILLATOR signal and some combination of Fast Gate 1 and Fast Gate 2 circuitry 48 and 57. Table 1 shows the eight possible combinations of latch values 50, 54, 58 and 62 and active AND gates in the decode circuitry 65 corresponding thereto, as a function of even and odd oscillator states.

TABLE 1

| Active Decode Circuitry | | | | |
|---|---|---|---|---|
| | | | Active AND Gates | |
| Latches 50 & 58 | Latch 54 | Latch 62 | Even Oscillator | Odd Oscillator |
| 0 | 0 | 0 | Gate 66 | Gate 74 |
| 0 | 0 | 1 | Inactive | Inactive |
| 0 | 1 | 0 | Gate 66 | Gate 80 |
| 0 | 1 | 1 | Gate 72 | Gate 80 |
| 1 | 0 | 0 | Gate 78 | Gate 74 |
| 1 | 0 | 1 | Gate 78 | Gate 68 |
| 1 | 1 | 0 | Inactive | Inactive |
| 1 | 1 | 1 | Gate 72 | Gate 68 |

The resulting decoded signals from AND gates 66 and 68 are input to OR gate 70, which results in an F0 CLOCK signal. Similarly, the output of AND gates 72 and 74 are applied to OR gate 76, resulting in an F1 CLOCK signal. The output of AND gates 78 and 80 are applied to OR gate 82, resulting in an F2 CLOCK signal.

Figure 3:
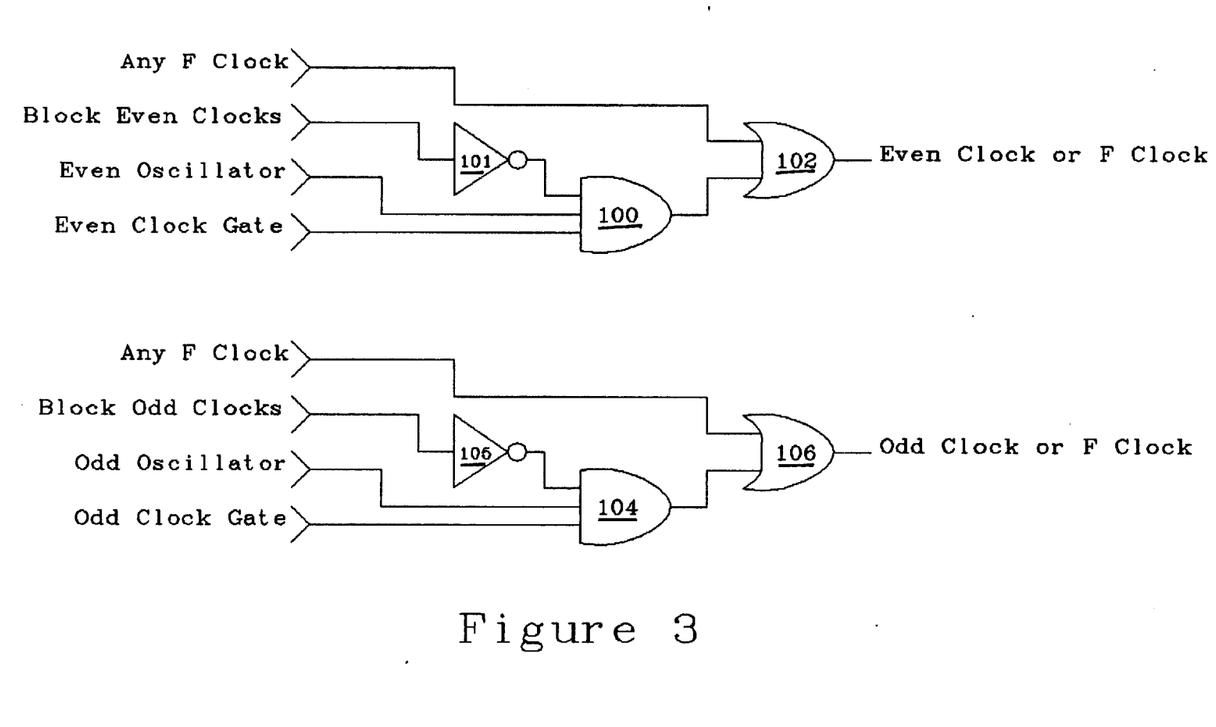
FIG. 3, is a logic diagram of a multiplexing circuitry example for use with embodiments of the present invention.

Referring now also to FIG. 3, there is shown a multiplexing circuit for use with embodiments of the present invention. A three-input AND gate 100 is adapted to receive a BLOCK EVEN CLOCK signal, the EVEN OSCILLATOR signal and the EVEN CLOCK GATE signal once the BLOCK EVEN CLOCK signal is inverted by inverter 101. The AND gate 100 generates a signal which is ORed by OR gate 102 with any of the F CLOCK signals, resulting in an EVEN CLOCK or F CLOCK signal, depending upon whether the ALLOW FTM signal is inactive or active, respectively. Similarly, gates 104 and 106 are combined to result in an ODD CLOCK or F CLOCK signal, depending on the state of the ALLOW FTM signal in the same manner.

Figure 4:
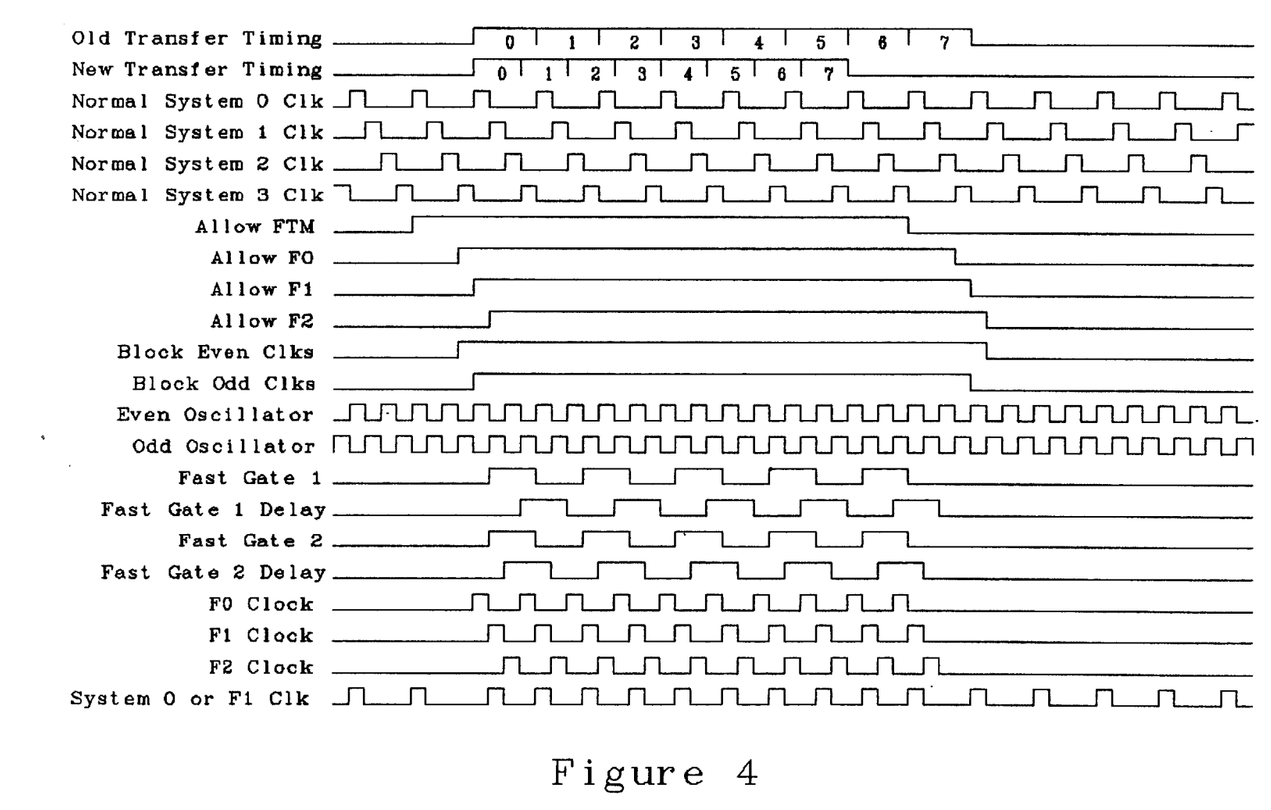
FIG. 4 is a timing diagram representing the occurrence of events during system operation.

Referring now also to FIG. 4, there is shown a timing diagram representing events as they occur in the system. The upper two lines on the timing diagram, Old and New Transfer Timing, represent respectively: (a) the time required to transfer eight double words of data from a first logical device to a second logical device under conventional four pulse clock systems, and (b) the time required to transfer the same amount of data under the new system in accordance with the present invention. NORMAL SYSTEM CLOCK 0 to NORMAL SYSTEM CLOCK 3 signals are conventional system clock timing signals used throughout the system to synchronize devices with one another. A clock cycle period in the preferred embodiment is 52 nanoseconds divided into four equal pulses. These signals are used to generate the ALLOW F signals, as described hereinabove with reference to FIG. 2a.

Referring now again to FIGS. 2a, 2b, 3, and 4, in operation the ALLOW FTM signal is first initiated to begin the fast data transfer process. This signal generates the ALLOW F0, ALLOW F1, ALLOW F2 signals as well as the BLOCK EVEN CLOCK and BLOCK ODD CLOCK signals via timing logic circuitry 29. It is the ALLOW F1 signal that starts and stops the fast gate circuitry 48 and 57 and that controls the output functions thereof.

Moreover, the BLOCK EVEN CLOCK and BLOCK ODD CLOCK signals are used to block the AND gates 100 and 104 (FIG. 3) when the fast data transfer mode is in effect. The BLOCK CLOCK signals suppress the conventional system clock signals, permitting the new F CLOCK signals to be generated in their place. With these ALLOW signals, Fast Gate 1 latch 50 and Fast Gate 2 latch 58 begin to toggle on and off with each F1 CLOCK signal. Along with them, corresponding Fast Gate 1 delayed latch 54 and Fast Gate 2 delayed latch 62 also begin to toggle on and off.

These operations result in the proper signals being decoded by AND gates 66–80 and OR gates 70–82. The F0 CLOCK, F1 CLOCK and F2 CLOCK signals are thereby generated for the system. These F CLOCK signals are then passed on to OR gates 102 and 106 and sent out for use by the system in transferring data between logical devices in the fast data transfer mode.

Thus, it can be seen that, when F CLOCK signals are gated out, data is transferred in three-pulse cycles; and when conventional clock signals are gated out, data is transferred in four-pulse cycles. The time savings in performing data transfer operations in three quarters of the conventional time required can be significant and can positively affect overall system performance.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A data processing system having multiple logical devices including a first logical device, a second logical device and a third logical device, with the data processing system having a conventional machine clock cycle for normal operation and a modified clock cycle for transferring clocked electronic data between the first and the second logical device, the improvement comprising:
   a system clock generator for providing the conventional machine clock cycle of a predetermined time interval;
   controlling means for controlling the rate of data transfer between said first logical device and said second logical device, said controlling means connected to receive inputs from said clock generator and including timing logic means for generating the modified clock cycle which constitutes a shortened clock cycle which is not half a machine cycle;
   gating means connected from said timing logic means to said first and second logical devices for allowing said first and second logical devices to accept data or to send data during the modified clock cycle which is a fractional part of the machine cycle; and
   wherein said timing logic means comprises a multi-phase device connected to said system clock generator for receiving clock signal inputs at a first rate of even number of pulses per clock cycle, said multi-phase device generating an output clock signal at a second rate of odd number of pulses per clock cycle with said even number and odd number of pulses having the same frequency and being in phase with each other, said odd number of pulses per clock cycle constituting the aforesaid shortened clock cycle thereby providing accelerated data transfer during such shortened clock cycle while alternatively allowing data transfers with said third logical device during the conventional clock cycle.

2. The data processor system in accordance with claim 1 wherein said first logical device is a main storage device and said second logical device is a high speed cache.

3. The data processing system in accordance with claim 1 wherein said first logical device is a high speed memory and said second logical device is a processor.

4. The data processing system in accordance with claim 1 wherein at least one of said first and second logical devices comprises a processor.

5. A data processing system having a predetermined machine clock cycle, comprising:
   (a) a memory device;
   (b) a logical device connected through a bus to said memory device for sending or receiving clocked electronic data to and from said memory device; and
   (c) controlling means connected to said memory device and to said logical device for controlling the rate of data transfer therebetween, said controlling means comprising:
      (i) generating means for generating a modified clock cycle shorter than the machine clock cycle without being an even numbered subdivision of the machine cycle; and
      (ii) gating means connected to said generating means for allowing said memory device and said logical device to exchange data at an accelerated rate during the shortened clock cycle, and
   wherein said generating means includes a multi-phase device which operates on a machine clock cycle having four pulses per cycle and generates a shortened clock cycle of three pulses for controlling data transfer between said memory and said logical device.

6. A data processing system having a predetermined machine clock cycle, comprising:
   (a) a memory device;
   (b) a logical device connected through a bus to said memory device for sending or receiving clocked electronic data to and from said memory device; and
   (c) controlling means connected to said memory device and to said logical device for controlling the rate of data transfer therebetween, said controlling means comprising:
      (i) generating means for generating a modified clock cycle shorter than the machine clock cycle without being an even numbered subdivision of the machine cycle; and
      (ii) gating means connected to said generating means for allowing said memory device and said logical device to exchange data at an accelerated rate during the shortened clock cycle, and
   wherein said memory device and said logical device are both capable of transferring data during either the machine clock cycle or alternatively during the shortened clock cycle produced by said generating means.

7. The data processing system in accordance with claim 6 wherein said generating means comprises a multi-phase device.

8. The data processing system in accordance with claim 7 wherein said multi-pulse device receives clock signal inputs at a rate of an even number of pulses per clock cycle.

9. The data processing system in accordance with claim 8 wherein said generating means for generating a shortened clock cycle generates clock pulses at a rate of an odd number of pulses per clock cycle.

10. The data processing system in accordance with claim 9 wherein said controlling means allows data to be transferred between said memory device and said logical device in a clock cycle time interval of $2n-m$ nanosecond, where $m=1,3,5,7,\ldots$ and for a given value n, $m<2n$.

11. The data processing system in accordance with claim 6 further comprising another logical device connected to said logical device for transferring clocked electronic data therebetween.

12. The data processing system in accordance with claim 11 further comprising a second controlling means connected with the aforesaid logical devices for establishing the machine cycle to be the rate of transfer of data therebetween.

13. The data processing system in accordance with claim 6 wherein said logical device is a high speed buffer.

14. The data processing system in accordance with claim 6 wherein said generating means comprises a multi-pulse device for generating clock pulses which are in phase with the clock pulses of the machine clock cycle.

15. The data processing system in accordance with claim 6 wherein said logical device comprises a processor.

16. In a data processing system having multiple logical devices including a high speed processor, a high speed cache memory, and a main storage device, an improved method of providing different rates of data transfer between some of the multiple logical devices including the steps of:

generating a system clock signal having an even number of clock pulses during each machine cycle;

shortening the machine clock cycle produced by said generating step by decreasing the number of clock pulses in each clock cycle to a fractionary number of clock pulses which fractionary number is an odd number of clock pulses in each machine cycle;

maintaining the even number of clock pulses produced by said generating step and the odd number of clock pulses produced by said shortening step to be in phase with each other and to have the same frequency as each other;

applying the machine clock cycle of even numbered pulses produced by said generating step to certain slower operating ones of such logical devices; and applying the shortened clock cycle with an odd number of pulses produced by said shortening step to certain faster operating ones of such logical devices to accelerate the transfer to electronically clocked data therebetween.

17. In a data processing system having a high speed processor, a high speed cache memory, and a main storage device, an improved method of controlling the rate of data transfer from the storage device into the cache memory, including the steps of:

generating a system clock signal having a given number of four sequential clock pulses during each machine cycle;

shortening the machine clock cycle produced by said generating step by decreasing the number of clock pulses in each clock cycle to a fractionary number of clock pulses which is not an even numbered subdivision of the clock pulses in each machine cycle, with said fractionary number being three sequential pulses of equal duration;

applying the shortened clock cycle produced by said shortening step to the cache memory and to the storage device to accelerate the transfer of electronically clocked data therebetween.

18. The method of claim 17 wherein the clock pulses produced by said generating step and said shortening step are in phase.

19. The method of claim 17 wherein the clock pulses produced by said generating step and said shortening step are of the same frequency.

* * * * *